United States Patent [19]
Marks et al.

[11] Patent Number: 5,299,842
[45] Date of Patent: Apr. 5, 1994

[54] FLUID LINE CLAMP

[75] Inventors: Ernest E. Marks; Willard L. Hofer; Nathan P. Lee, all of Boise, Id.

[73] Assignee: Micron Technology, Inc., Boise, Id.

[21] Appl. No.: 919,465

[22] Filed: Jul. 24, 1992

[51] Int. Cl.$^5$ .............................. F16L 19/02
[52] U.S. Cl. .................... 285/325; 285/328; 285/412; 285/368; 285/415
[58] Field of Search .............. 285/328, 420, 412, 414, 285/415, 325, 327, 368

[56] References Cited

U.S. PATENT DOCUMENTS

| | | | |
|---|---|---|---|
| 674,928 | 5/1901 | Mauran | 285/412 |
| 733,995 | 7/1903 | Profitlich et al. | |
| 1,186,325 | 6/1916 | Metzger | 285/414 X |
| 1,592,093 | 7/1926 | Foucault | |
| 1,906,826 | 5/1933 | Smith et al. | 285/328 X |
| 2,461,856 | 2/1949 | Tornberg | 285/412 X |
| 2,950,130 | 8/1960 | Schneider | |
| 3,103,956 | 9/1963 | Focht | 285/368 X |
| 3,180,714 | 4/1965 | Kremer et al. | |
| 3,214,202 | 10/1965 | Maychark | |
| 3,414,297 | 12/1968 | Pollia | |
| 3,565,465 | 2/1971 | Wemyss | |
| 3,582,029 | 6/1971 | Moesta | 248/68 |
| 3,587,010 | 6/1971 | Walsh | 285/368 X |
| 3,609,638 | 9/1971 | Darrey | 339/75 P |
| 3,642,307 | 2/1972 | Brickhouse et al. | 285/38 |
| 3,877,734 | 4/1975 | Brozek | 285/249 |
| 3,879,070 | 4/1975 | Russ | 285/342 |
| 4,076,281 | 2/1978 | Davis | 285/64 |
| 4,215,880 | 8/1980 | Trittipoe | 285/368 X |
| 4,223,799 | 9/1980 | Eyster | 220/230 |
| 4,262,943 | 4/1981 | Armstrong | 285/420 |
| 4,289,295 | 9/1981 | Jackson | 251/149.2 |
| 4,313,828 | 2/1982 | Brownlee | 210/198.2 |
| 4,343,496 | 9/1982 | Petranto | 285/39 |
| 4,343,498 | 8/1982 | Campanini | 285/174 |
| 4,412,693 | 11/1983 | Campanini | 285/39 |
| 4,488,741 | 12/1984 | Conley et al. | 285/250 |
| 4,519,634 | 5/1985 | Hand | 285/55 |
| 4,547,004 | 10/1985 | Goldberg | 285/31 |
| 4,586,734 | 5/1986 | Grenier | 285/340 |
| 4,613,171 | 9/1986 | Corcoran | 285/197 |
| 4,635,972 | 1/1987 | Lyall | 285/242 |
| 4,685,708 | 8/1987 | Conner et al. | 285/374 |
| 4,750,762 | 6/1988 | Corzine | 285/45 |
| 4,756,558 | 7/1988 | Beamer | 285/39 |
| 4,973,065 | 11/1990 | Habich | 277/87 |
| 4,993,755 | 2/1991 | Johnston | 285/315 |
| 5,066,051 | 11/1991 | Weigl et al. | 285/328 |
| 5,082,391 | 1/1992 | Florida | 403/342 |
| 5,088,773 | 2/1992 | Gralenski | 285/328 X |

FOREIGN PATENT DOCUMENTS

| | | | |
|---|---|---|---|
| 552154 | 12/1959 | Belgium | 285/415 |
| 9684 | 7/1901 | Norway | 285/414 |

Primary Examiner—Randolph A. Reese
Assistant Examiner—Heather Chun
Attorney, Agent, or Firm—Wayne E. Duffy

[57] ABSTRACT

A removable clamping device is described which uniformly and effectively joins two fluid transmission lines at their normal termination points, using standard adapter flanges and removable seals and generally "C" shaped clamps having narrow slots therein which are designed to just slip over the smallest diameter of the adapter or fluid line and bear against the respective connecting flanges. The two clamps are held together by threaded bolts which are spaced equally about the clamps and which may be tightened or loosened without exerting undesirable rotational torque about the long axis of the fluid line connection, thus avoiding possible breakage and leakage.

3 Claims, 4 Drawing Sheets

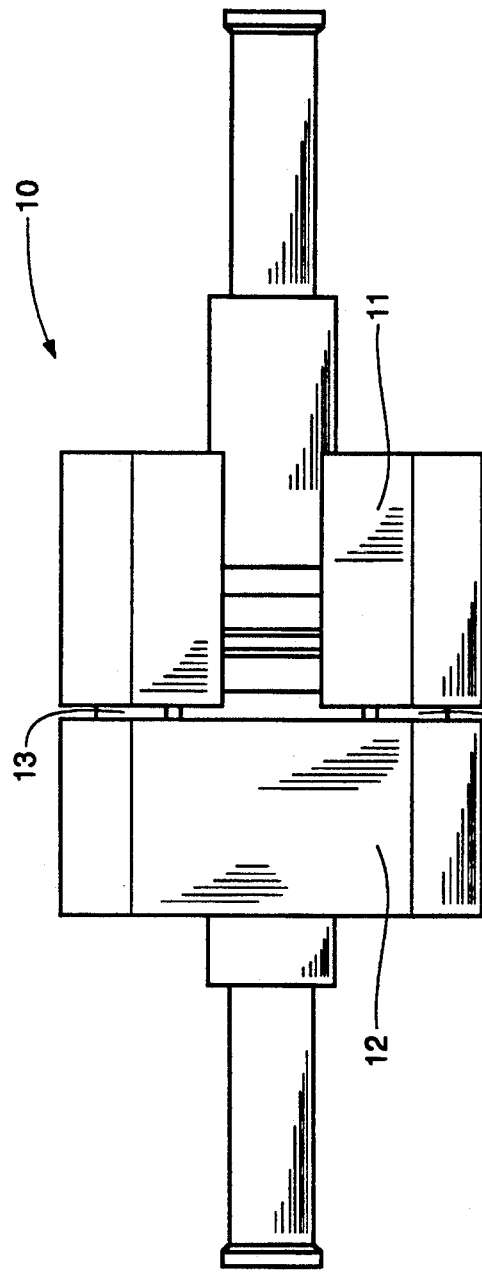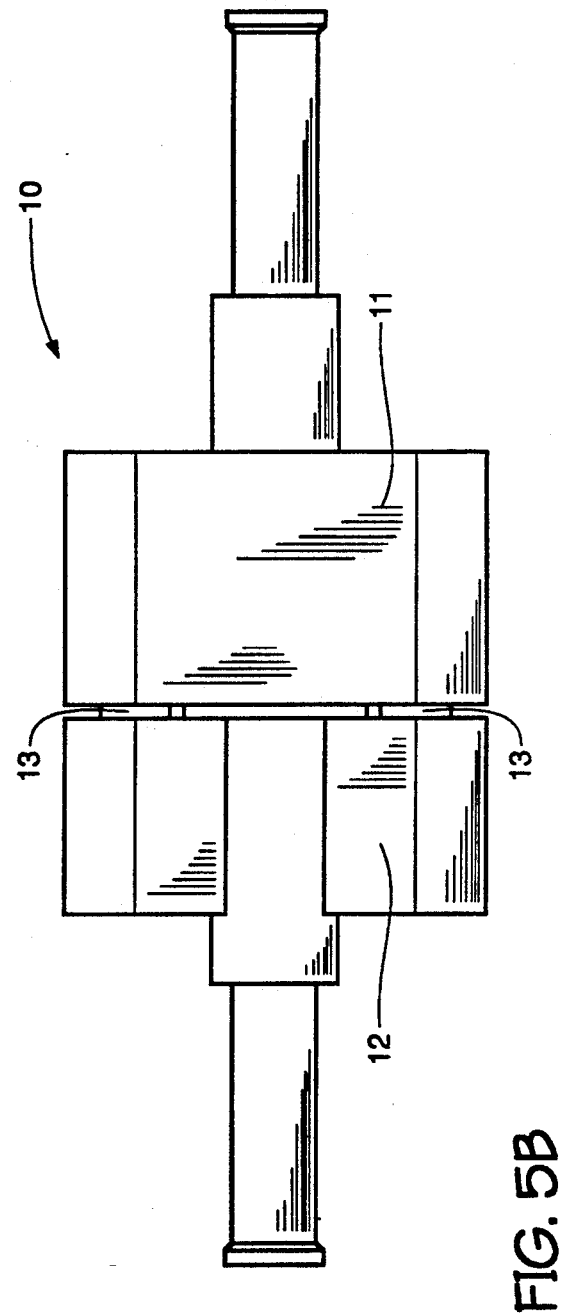

FLUID LINE CLAMP

BACKGROUND OF THE INVENTION

1. Field of the Invention

This invention relates to a removable clamping device to uniformly join pressurized gas lines at a normal gland termination which uses "C" shaped end plates and bolts to pull the standard gas line glands directly and axially toward each other and hold them in place without application of rotational torque about the long axes of the joined gas lines.

2. Prior Art

Pressurized gas lines, such as those carrying reactive gases used in various semiconductor manufacturing processes, are often vulnerable to stress induced leaks and breakage. This causes significant down time and production loss. Standard fittings used to join connecting lines, such as, but not limited to those supplied by Cajun, VCR and Fox, require the application of rotational torque about the long axes of the lines to tighten and seal or to loosen the joints. This places excessive stress upon the unions, leading to leaks and breaks in the lines. Furthermore, the customary physical locations of the lines along flat surfaces or on supporting structures often make it difficult to tighten or loosen line connections with standard tools, without risking breakage.

Inspection of patent literature reveals many gas line connecting means, virtually all of which require the application of rotational torque about the long axis of the connecting lines to achieve satisfactory seals.

One invention, U.S. Pat. No. 1,592,093, issued Jul. 13, 1926, to Foucault, describes a union for pipes in which the junction is affected by means of rings that can engage laterally with each other by means of matching collars and grooves, with appropriate stops to prevent accidental separation. The rings are generally "C" shaped and may be screwed on the tubes or otherwise connected to the pipes or even integral with the pipe The single claim seems restricted to threaded fittings which necessarily involve application of rotational torque for tightening of the end seals. This invention will be distinguished from the present invention in the summary of the invention.

A second invention, U.S. Pat. No. 2,950,130, issued Aug. 23, 1960, to Schneider, describes a "fluid pressure responsive pipe coupling having identical halves", which is designed primarily to provide quick detachment of the connecting lines. The operation and interconnection of the halves involves the application of rotational torque about the long axes of the connecting lines. This is avoided in the present invention.

SUMMARY OF THE INVENTION

This invention provides a clamping means to join opposed and generally matching ends of two gas lines which have, between said ends, a suitable gasket or other sealing means which will, when properly clamped and sealed, provide a gas tight connection between the two gas lines that is less likely to leak or break during connection and disconnection and under normal operating conditions.

The design of the generally matching and opposing ends of the two connected gas lines, as well as the gasket or other sealing means, are well-known and will depend upon the use intended and the nature of the reactive or other gas being transported. The clamping means, which is the essential element of this invention, consists primarily of two "C" shaped end plates One end plate is removably placed on each opposing end of the connecting gas lines and the two are held together by a plurality of bolts, which serve to pull the facing, generally parallel surfaces of the end plates and the inclosed glands directly toward each other on the same central axis, to seal tightly against a gasket or other sealing means and the connecting ends of the gas lines. The "C" shaped end plates have their two facing, generally parallel ends in close proximity, with their respective open sides facing 180 degrees away from each other and normal to the long central axis of the gas lines, so that the circumferential bearing forces of the end plates upon the glands is effectively uniform and parallel to the central axis of the connecting gas lines. This serves to pull the glands evenly together against the sealing means. By tightening the plurality of screws evenly to draw the lines together, the torque exerted upon the connecting lines is virtually eliminated and the likelihood of breakage or leakage in the lines is avoided or greatly reduced.

The Foucault invention involves pipe connections with threaded ends, upon which rotational torque must be applied to tighten or loosen the connection. At least one of the rings must be screwed on to the pipe, further involving torque forces. These conditions are avoided in this invention.

DESCRIPTION OF THE DRAWINGS

FIGS. 5A, 5B are opposing views of the closed assembly with end plates holding the gas lines together.

DESCRIPTION OF THE PREFERRED EMBODIMENT

The preferred embodiment describes a typical application for the fluid line clamp as a means for connection of two sections of a pressurized gas line used in various semiconductor manufacturing processes for the transport of pressurized reactive gases. The gas lines are of known composition, dimension and design and have, at their connecting ends, glands or sealing surfaces of known design. These sealing surfaces are often of matching configuration, with knife edges or other distinct, uniform shapes, such as raised, circular rings or ribs or grooves, which circumscribe the long axis of the gas lines, are integral parts of the pipe or tubing gland and are designed to press and seal against a gasket of suitable material This gasket is of known composition and design It may be flat or rounded in cross-section and is made of metal or other material suitable for the operating conditions and the particular gas being transported These features are not a part of this invention but are the parts which the invention is intended to affect in its operation.

Figure 1C:
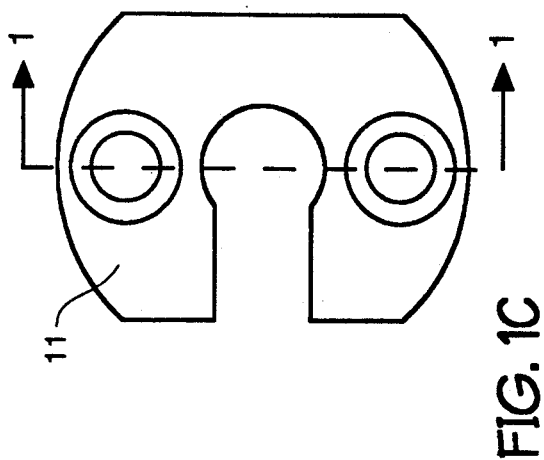
FIGS. 1A, 1B, 1C are front, back and side schematic views, respectively, of one of the ends plates, showing recesses for bolts and pipe gland shoulders.
Figure 1B:
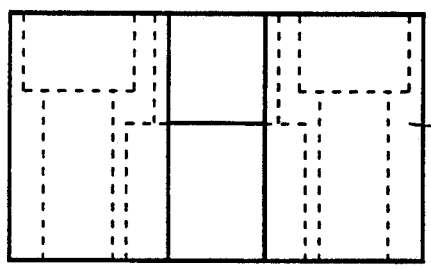
Figure 1D:
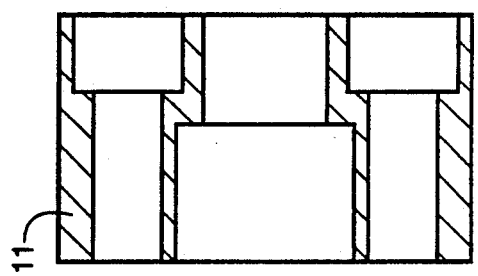
FIG. 1D is a schematic view of section 1—1 of FIG. 1C.
Figure 1A:
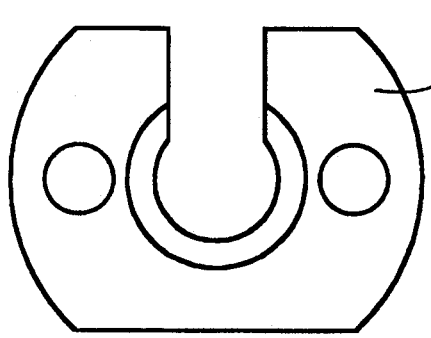

Referring to FIG. 5, the "C" shaped end plates 11 and 12, with a plurality of removably attached bolts 13, comprise the invention 10. Referring to FIGS. 1A, 1B, 1C and 2A, 2B, 2C, end plates 11 and 12 are formed from suitable material, usually metal, in a general cylindrical shape, which is truncated equally on two opposing curved sides to form parallel flat surfaces, as seen in FIGS. 1A and 1C. The cylinder also is flat on each opposing end with the surfaces parallel to each other and normal to the central axis of the cylinder, as seen in FIGS. 1B and 1D.

Figure 3:
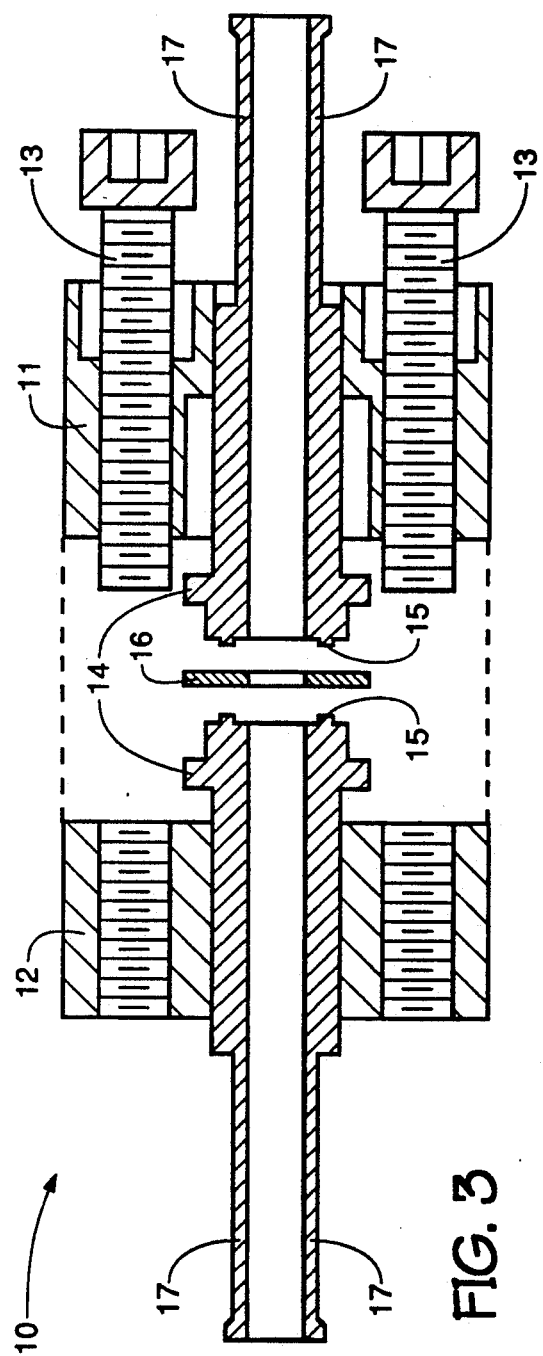
FIG. 3 is an exploded cross-sectional schematic view of the assembled device
Figure 4:
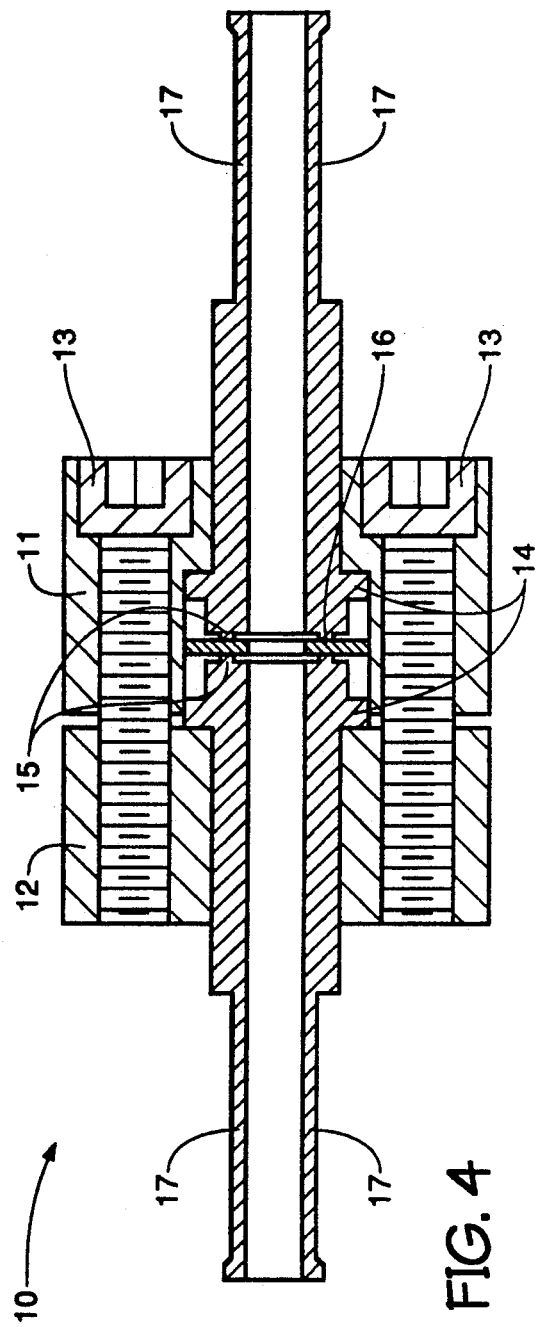
FIG. 4 is a closed, cross-sectional schematic view of the assembled device.

Referring to FIGS. 3 and 4, in the preferred embodiment, the glands on the ends of the two connecting gas lines are identical in design and dimension (gas lines not shown). The opposing ends 17 of the glands, which are fixedly attached to the gas lines, are of the same outside dimension as the gas lines for a distance at least equal to the length of the end plate 11. Toward the connecting ends, for a short distance, the outside diameter of the glands then is increased slightly to provide strength and rigidity and a base for a shoulder 14, against which the end plates 11 and 12 can exert uniform force when holding the connecting glands together. The internal diameters of the gas lines and glands are equal throughout.

As seen in FIGS. 3 and 4, the ends of the glands which seal against the gasket 16, are identical in design and dimension and have, on their respective matching faces, integral concentric, round ribs 15 circumscribing the openings in the gas lines, which are designed to press evenly and smoothly against the opposing flat, parallel faces of the round gasket 16, and seal together the two connecting gas lines when the end plates 11 and 12 are brought toward each other. The concentric opening in the gasket typically is of the same diameter as the internal openings in the glands.

Figure 2A:
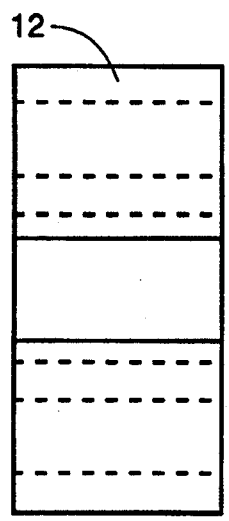
FIGS. 2A, 2B are side and end schematic views, respectively of the matching end plate to that shown in FIG. 1A.
Figure 2B:
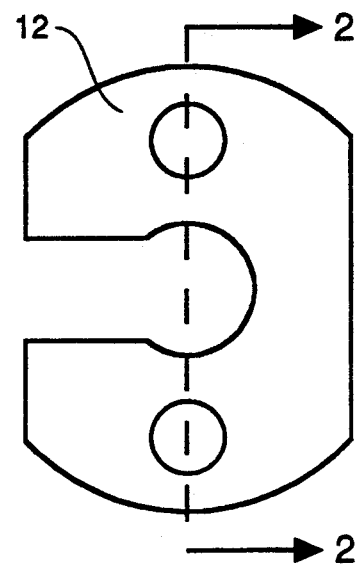

In the preferred embodiment, as seen in FIGS. 1A, 1C and 2B, the end plates 11 and 12 each have a slot extending along one side, with opposing faces parallel to the central axes of the plates and which intersect the side of the concentric opening extending laterally along the central axis and throughout the length of the cylindrical shaped body of the end plate and reaching through the outer surface of the end plate. This slot then forms the generally "C" shape of the clamp. The widths of the slots are selected to just exceed the respective outside diameters of the gas lines, in order that the slotted end plates may be slipped easily on and off the lines during connection and disconnection of the lines, while retaining the optimum bearing surface for the end plates against the shoulders of the opposing glands 14 when the ends are being held together. The opposing internal surfaces of the slots are parallel, flat and smooth.

Referring to FIG. 1A, the concentric central openings in end plates 11 and 12 are designed to closely circumscribe the slightly increased diameter of the pipe glands. End plate 11 maintains this diameter for approximately half of the distance between the opposing ends of the plate. A slightly larger, concentric opening then extends the remainder of the distance to the surface of the end plate, which faces the opposing end plate 12 when the two plates are in juxtaposition and holding the glands together. The difference in diameters between the two concentric openings in end plate 11 provides a concentric shoulder which will press against a matching shoulder 14 on the gland to maintain uniform pressure against the gasket sealing means 16.

Referring to FIGS. 1B, 1C and 1D, end plate 11 has two parallel circular openings extending through the plate equidistant from and parallel to the central axis of the plate, which have a smooth bore and serve as passages for two threaded bolts 13. In the preferred embodiment these openings also have a slightly larger recessed concentric opening in one end of the plate to enclose the heads of the respective bolts.

Figure 2C:
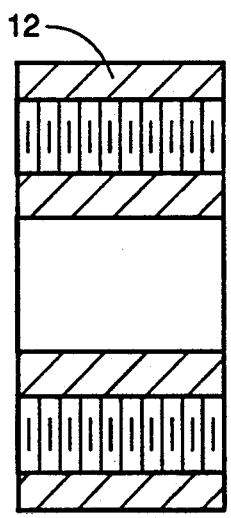
FIG. 2C is a schematic view of section 2—2 of FIG. 2B.

Referring to FIGS. 2A, 2B and 2C, end plate 12 also has two parallel circular openings extending through the plate equidistant from and parallel to the central axis of the plate, with threads to match and secure the threaded bolts 13 which extend through end plate 11 to pull the end plates 11 and 12 together to seal the connecting tubing glands against the gasket 16 and connect the gas lines.

In summary, when the tubing ends to be joined are placed in close proximity to each other and end plate 11 is slipped in position over the tubing sized end of the gland and moved toward the opposing end of the gland to seat against the shoulder of the gland, the gasket may be placed against the flat rib on the face of the gland. The end plate 12 is similarly slipped over the tube sized section of the gland attached to the opposing tubing end, with the open slot side of end plate 12 facing in a direction 180 degrees opposed to the open slot side of end plate 11. End plate 12 is moved in close proximity to end plate 11 with the bolt openings on the two end plates in matching configuration. Threaded bolts 13 are then introduced through the two exposed openings in end plate 11 and threaded into the threads in the matching threaded openings in end plate 12. The bolts are then tightened evenly with a predetermined, uniform force and the opposing glands on the opposing tube ends are sealed against the gasket to make a secure and gas tight seal for the transfer of selected gases. When the tubing is to be disconnected for service, repair or other purposes, the process of assembly just described is reversed.

The removable end plates which hold the tubing glands together are easily positioned, tightened and loosened with no appreciable rotational force being applied about the long axis of the connecting gas lines. If desirable, the opposing flat surfaces on the truncated sides of the two joined end plates can be held stationary by the overlapping jaw surfaces of a single wrench while the end plate connecting bolts are being tightened or loosened. A second option would be to insert the end plates into an adjustable support structure, not shown, which will contain and support the flat truncated sides of the end plates and prevent rotation during tightening or loosening of the connecting bolts and still permit axial movement of the gas lines which might occur from expansion or contraction of the gas lines. The correct assembly of the end plates can be assured by slightly asymmetric location of the bolt holes or by indexing pins or key and slot means.

The invention has been described in one preferred embodiment but other variations and modifications may occur to those skilled in the art. However, the scope of the present invention is not limited by the above described details but only by the appended claims.

What is claimed is:

1. A removable, torque free, clamping device to firmly join fluid transmission lines at their respective termination points, said device comprising:

a) a first one piece end plate having a defined surface bound and a first axis and a second bisecting axis normal thereto, with a larger annular opening and a proximate and successive smaller annular opening concentric with and extending along said first axis and with a narrow slot having sides parallel to each other and equidistant from said second axis, traversing said first axis and extending along said second axis from the outer surface on one side of said plate and intersecting the two concentric and successive annular openings;

b) a second one piece end plate having a defined surface boundary having a third axis and a fourth bisecting axis normal thereto, with an annular opening concentric with and extending along said third axis, said second plate having a narrow slot having sides parallel to each other and equidistant from said fourth axis, transversing said third axis and extending along said fourth axis from the outer surface on one side and intersecting said annular opening of said second plate;

c) said first end plate and second end plate each having a plurality of matching annular bores extending therethrough, parallel to and located radially from said first axis, with the annular bores in said first end plate having a smooth bore and the matching bores in the second end plate being threaded to hold and contain a plurality of standard threaded bolts connecting and evenly axially drawing together said first end plate and second end plate during the use of said torque free clamping device;

d) two fluid line termination adapters, having matching, concentric annular openings extending therethrough, each with a radially outwardly extending flange integral thereto, which circumscribes one end and is concentric with the longitudinal axes of said adapters, which, on their respective opposing ends, are each fixedly and fluidly attachable to a termination point of a fluid transmission line being connected to another fluid line; and e) said line termination adapter flanges having on the end surfaces which proximately face each other on a common longitudinal axis when the line termination points are to be joined, suitable sealing surfaces opposing each other, which seal against opposing sides of a suitable removable gasket to sealably and fluidly connect said fluid lines.

2. The removable, torque free clamping device of claim 1 wherein:

a) said first end plate is of generally cylindrical shape, with parallel opposing ends and said first axis defining and circumscribed by said annular opening concentric with and extending between said ends, said opening having a larger diameter from one end to midway therethrough and a smaller diameter from midway to the opposing end of said cylinder, to circumscribe closely, contain and confine the body and integral flange of one of the two fluid line termination adapters being used;

b) said first end plate and said second end plate each having said narrow slot therein designed to just allow each end plate to be removably slipped radially over the fluid line adapter at its point of smallest diameter and where said adapter is connected to the fluid transmission line;

c) said second end plate is of generally matching cylindrical shape, with parallel opposing ends said concentric annular opening of said second end plate extending therethrough around said third axis, which is equal in diameter to the smaller annular opening in the first end plate and which serves to closely confine and contain the body of the other one of the two typical fluid line termination adapters being used and to bear against the integral flange of said adapter when the fluid lines are connected; and d) the plurality of parallel annular bores in the first end plate and the second end plate, which accommodate the plurality of connecting threaded bolts, are equidistant from the first axis and located equiangularly about the ends of the cylindrically shaped end plates in such a manner as to achieve even and uniform compressing forces between the two end plates when the fluid transmission liens are being connected.

3. The removable clamping device of claim 2 wherein the first end plate and the second end plate are of generally matching orthogonal shape, having parallel opposing ends and parallel opposing sides.

* * * * *